Figure 1:
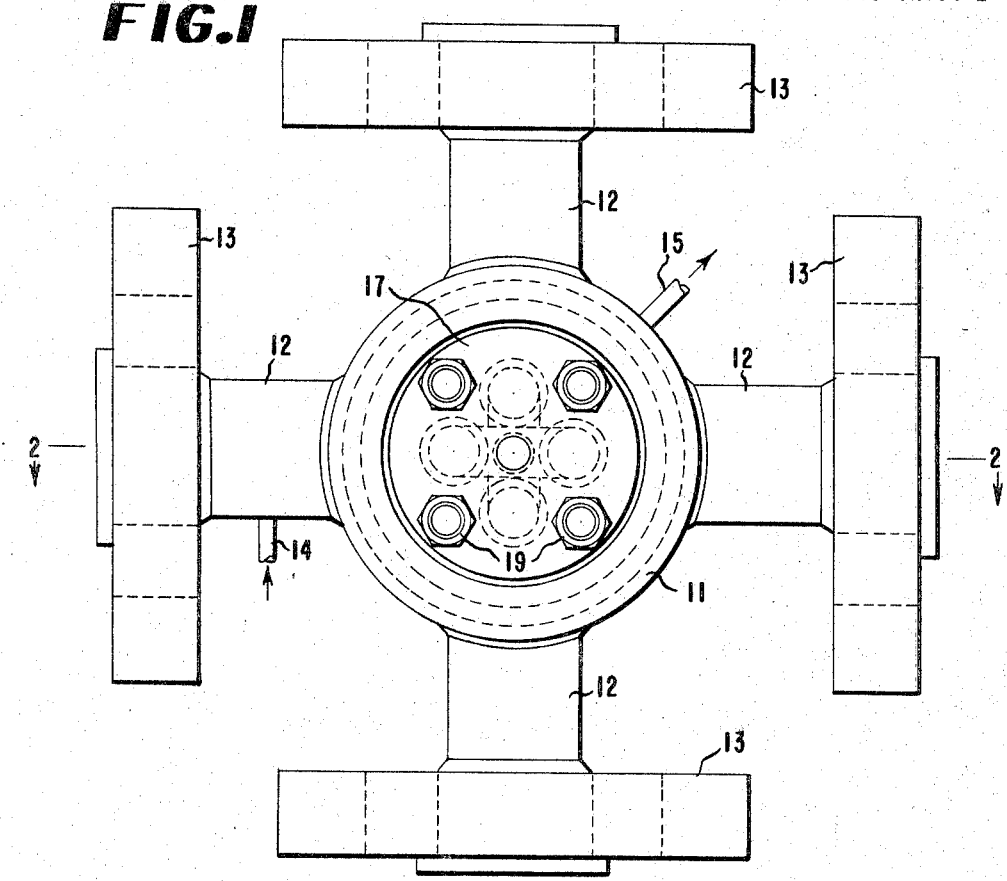

June 6, 1967     R. T. HOLTON     3,323,540

FLOW-DIRECTING DEVICE FOR MOLTEN POLYMER

Filed Jan. 8, 1965     2 Sheets-Sheet 1

INVENTOR
ROY TUNSTALL HOLTON
BY Norris E. Ruckman
ATTORNEY

June 6, 1967  R. T. HOLTON  3,323,540
FLOW-DIRECTING DEVICE FOR MOLTEN POLYMER
Filed Jan. 8, 1965  2 Sheets-Sheet 2

INVENTOR
ROY TUNSTALL HOLTON

BY *Norris E. Rockman*

ATTORNEY

United States Patent Office 3,323,540
Patented June 6, 1967

3,323,540
FLOW-DIRECTING DEVICE FOR MOLTEN
POLYMER
Roy Tunstall Holton, New Bern, N.C., assignor to E. I. du Pont de Nemours and Company, Wilmington, Del., a corporation of Delaware
Filed Jan. 8, 1965, Ser. No. 424,332
1 Claim. (Cl. 137—270)

This invention pertains to fluid-flow-directing conduit systems, and more particularly to a class of multi-way piping connection with interchangeable flow-directing parts especially useful in handling molten polymeric fluids.

A multitude of valves have been designed to direct and control the flow of fluids in conduits of various types. In complex interconnected fluid piping systems, where fluids from either of several sources are directed to either of several available destinations, valves of great complexity of design have been constructed and used. It is apparent, however, that the problems of designing a valve for such systems are greatly magnified when the system must handle, for example, molten polymer under very high pressure. Not only are conventional valves subject to leaks and temperature control difficulties, but also suffer from dead spots in which stagnant portions of a polymer stream undergo undesirable degradation reactions. Suitable valves for such use, characterized by simple design and inexpensive construction, have not been available prior to this invention.

The present invention provides an inexpensive multiple-port flow-selector device of simple design suitable for handling hot fluids such as molten polymer. The device is arranged to provide for the connection of any one port with any other port, or combination of ports, without stagnant dead-ends or pockets of delayed flow, and without leakage, even when operating under a very high pressure. An important feature is the provision of means for heating or cooling the device with circulating fluids.

In accordance with this invention there is provided a multi-port flow-selector assembly comprising a central body member having ports for operative connection with a plurality of pipe lines; a removable plug mating with the central body member with channels in the plug arranged to receive a liquid from one port of the central body member and direct it to another port of the central body member; jacket means surrounding the central body member for receiving or circulating heating or cooling fluid; and a portion of the jacket surrounding the sides of said plug for heating or cooling the plug, the plug being arranged for ready removal for replacement with another plug having a different arrangement of channels for other pipe connections.

Figure 2:
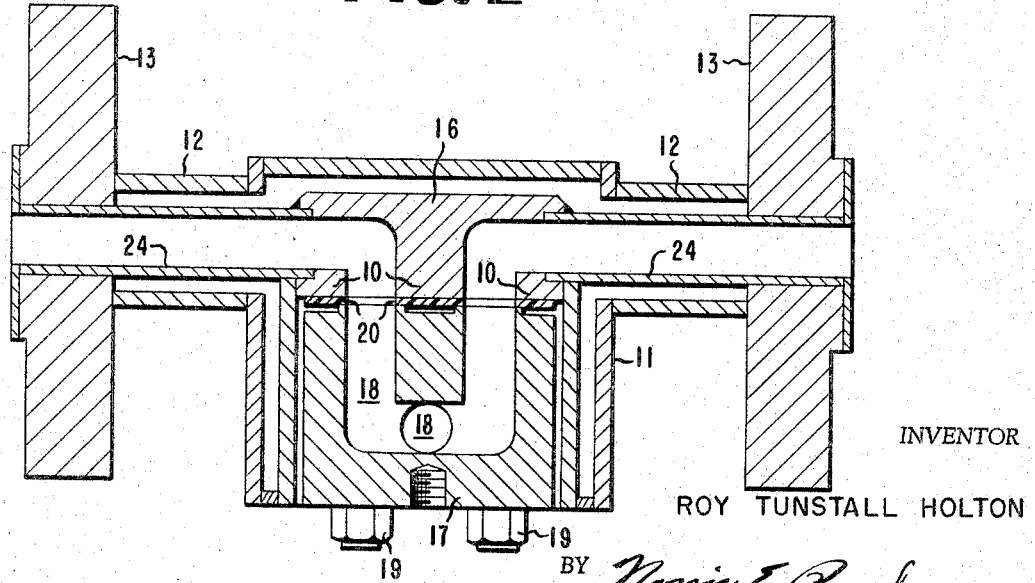
Figure 3:
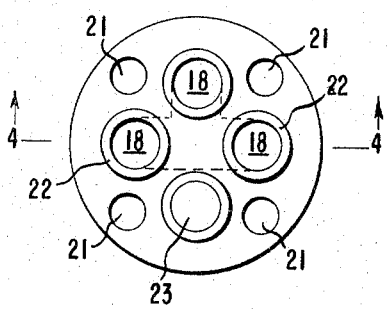
Figure 4:
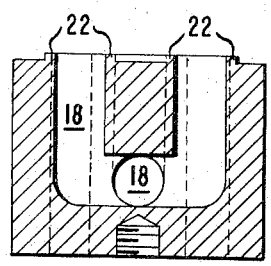
Figure 5:
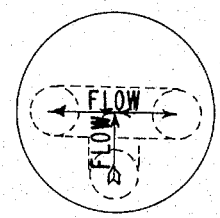
Figure 6:
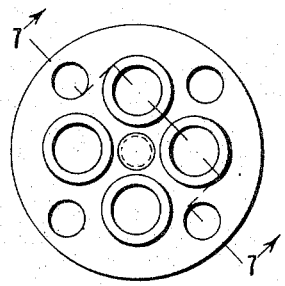
Figure 7:
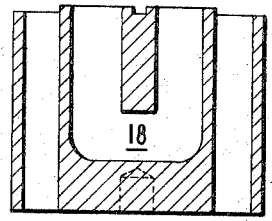
Figure 8:
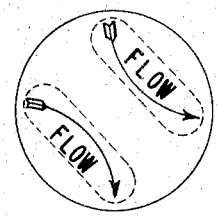
Figure 9:
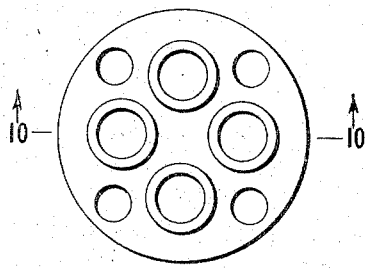
Figure 10:
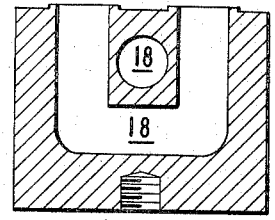
Figure 11:
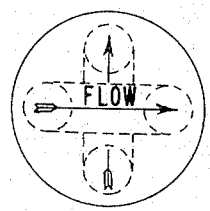
Figure 12:
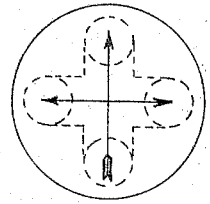

The objectives and advantages of the invention may be more easily understood by reference to a preferred embodiment as illustrated in the accompanying drawings wherein:

FIGURE 1 is a bottom plan view of the flow selector device,

FIGURE 2 is a partial cross-sectional view of the flow selector device, taken through the line 2—2 shown in FIGURE 1, FIGURE 3 is a top plan view of a flow selector plug for use in the flow selector device, FIGURE 4 is a sectional view of the plug of FIGURE 3, taken along line 4—4 of FIGURE 3, FIGURE 5 is a digrammatic representation of the flow pattern provided by using the plug shown in FIGURES 3 and 4, FIGURE 6 is a top plan view of another flow selector plug suitable for use in the device shown in FIGURES 1 and 2, FIGURE 7 is a sectional view taken along line 7—7 of FIGURE 6, FIGURE 8 is a diagrammatic representation of the flow pattern through the plug of FIGURES 6 and 7, FIGURE 9 is a top plan view of an alternative plug having a simple cross-over flow pattern with no intermixing, FIGURE 10 is a sectional view taken along line 10—10 of FIGURE 9, FIGURE 11 is a diagrammatic representation of the flow pattern of the plug of FIGURES 9 and 10, and FIGURE 12 is a diagrammatic representation of the flow pattern through the plug of FIGURES 1 and 2.

Referring to FIGURES 1 and 2, the flow pattern selector device comprises an outer casing member 11 having four ports 12 with flanged ends 13 suitable for connecting with conventional piping flanges. Within outer casings 11 and 12, and separated therefrom, is fluid conduit wall 24 (FIGURE 2). The space between the outer casings and the fluid conduit wall 24 connects with inlet nipple 14 and outlet nipple 15 (FIGURE 1) which may be used to supply heating or cooling fluid to said space and help control the temperature of the flow selector device. Fluid conduit 24 is connected to central body member 16 which is drilled to provide channels connecting with each port with corresponding opening in flow-selector face 10 by a 90° turn in the path of the conducted liquid. To the bottom of this face of body member 16 is attached removable flow-selector plug 17. Drilled passageway 18 conducts the fluid through the plug from one bottom opening of body member 16 to another. Nut and bolt assemblies 19 hold plug 17 in position, with gasket 20 providing a fluid-tight connection between plug 17 and body member 16.

FIGURES 3 and 4 show plan and sectional views, respectively, of an alternative selector plug which may be used in place of plug 17 of FIGURE 2. The passageways drilled in the plug of FIGURE 3 provide the flow pattern indicated in FIGURE 5 in which any three ports of the selector assembly may be connected in a T pattern. The plug has four bolt holes 21 for attachment to body member 16. The bolt holes are arranged in a symmetrical pattern which allows the plug to be oriented in any one of four positions. The top surface of the plug has raised boss sections 22 around each opening to assist in providing fluid-tight seals with gasket 20. Portion 23 of the top surface of the plug of FIGURE 3 is not drilled, thereby providing means for blanking off one of the four ports of central body member 16 when this plug is in use.

FIGURES 6 and 7 show plan and sectional views, respectively, of another alternative selector plug which may be used in place of plug 17 of FIGURE 2. The passageways drilled in the plug of FIGURE 6 provide the flow pattern indicated in FIGURE 8 in which opposite pairs of adjacent ports are connected, with no interchange between pairs.

Plugs having the flow patterns of FIGURES 5, 8, 11 and 12 are usually sufficient to provide any desired fluid flow path through the flow selector device.

A particularly effective fluid flow selector device is achieved by placing two units, such as that shown in FIGURES 1 and 2, "back-to-back" to give a combination having six ports and two selector plugs. Other multi-unit combinations will be obvious to those skilled in the art.

In operation, piping connections 14 and 15 are connected to auxiliary equipment of conventional type supplying a heating fluid (e.g., an eutectic mixture of phenyl ether and diphenyl) to the flow selector jacket. Process liquid, e.g., molten polymer, from a source not shown in the drawings, enters one port of the flow selector and travels through conduit 24 to central body member 16, where it turns downwardly and enters channel 18 of plug 17. Channel 18 carries the fluid to another connecting channel in central body member 16 and then directs the process liquid outwardly through another port to auxiliary piping, not shown.

A change in flow pattern is achieved by momentarily stopping the flow of process liquid, removing four nuts 19, removing plug 17 from the device, substituting a preheated plug having the desired kow pattern (also substituting a new gasket, if desired), replacing nuts 19 and then restarting the flow of process liquid through the device. During the change, a constant temperature is maintained by heating fluid in the heating jacket of the device. The change is quick and simple, no piping disconnections need be made for the heating jacket (as would be required when jacketed pipe sections are interchanged in a prior art system) no stagnant pockets of process liquid are present, and positive control of leaks is achieved.

Although the drawings show the flow-selector device oriented horizontally with the plug inserted from the bottom, it is understood that the device is equally useful when oraiented in any other manner desired.

It is seen that a novel and useful type of flow pattern selector has been provided with the combined advantages of good functionality, simplicity and low cost. Many changes and modifications may be made in the disclosed apparatus without departing from the spirit of the present invention which is therefore intended to be limited only by the scope of the appended claim.

I claim:

An improved flow-directing device for molten polymer, having a central body member, a flow-selector face on the body member, four ports extending from said body member in different directions for operative connection to pipes for molten polymer, four distinct polymer channels through said body member, each channel extending from a different port to a separate location on said flow-selector face, and jacket means surrounding said body member for circulating fluid to control the temperature of the device; wherein the improvement comprises an opening through said jacket to said flow-selector face for a removable flow-selector plug, a set of interchangeable plugs for use on said face to provide any desired fluid flow path through said device by selection of the proper flow-selector plug, a different arrangement of passageways in each of said plugs terminating at openings mating with said polymer channels at the flow-selector face, raised boss sections around each plug opening for providing fluid-tight seals between the plug and the flow-selector face, and means for bolting any one of the plugs to the flow-selector face in a fixed position.

References Cited
UNITED STATES PATENTS

| | | | |
|---|---|---|---|
| 1,212,886 | 1/1917 | Benson | 137—625.18 X |
| 1,461,520 | 7/1923 | Forman | 137—340 |
| 2,900,995 | 8/1959 | Dickerson et al. | 137—340 |
| 2,911,008 | 11/1959 | DuBois | 137—625.18 X |
| 2,990,853 | 7/1961 | Sharp | 137—625.43 X |

M. CARY NELSON, *Primary Examiner.*